W. R. HUDSON.
TRAILER TRUCK.
APPLICATION FILED NOV. 1, 1915.

1,214,037.

Patented Jan. 30, 1917.
2 SHEETS—SHEET 1.

Warren R. Hudson
Inventor

Witness
Chas. I. Mlch

By Staley & Bowman
Attorney.

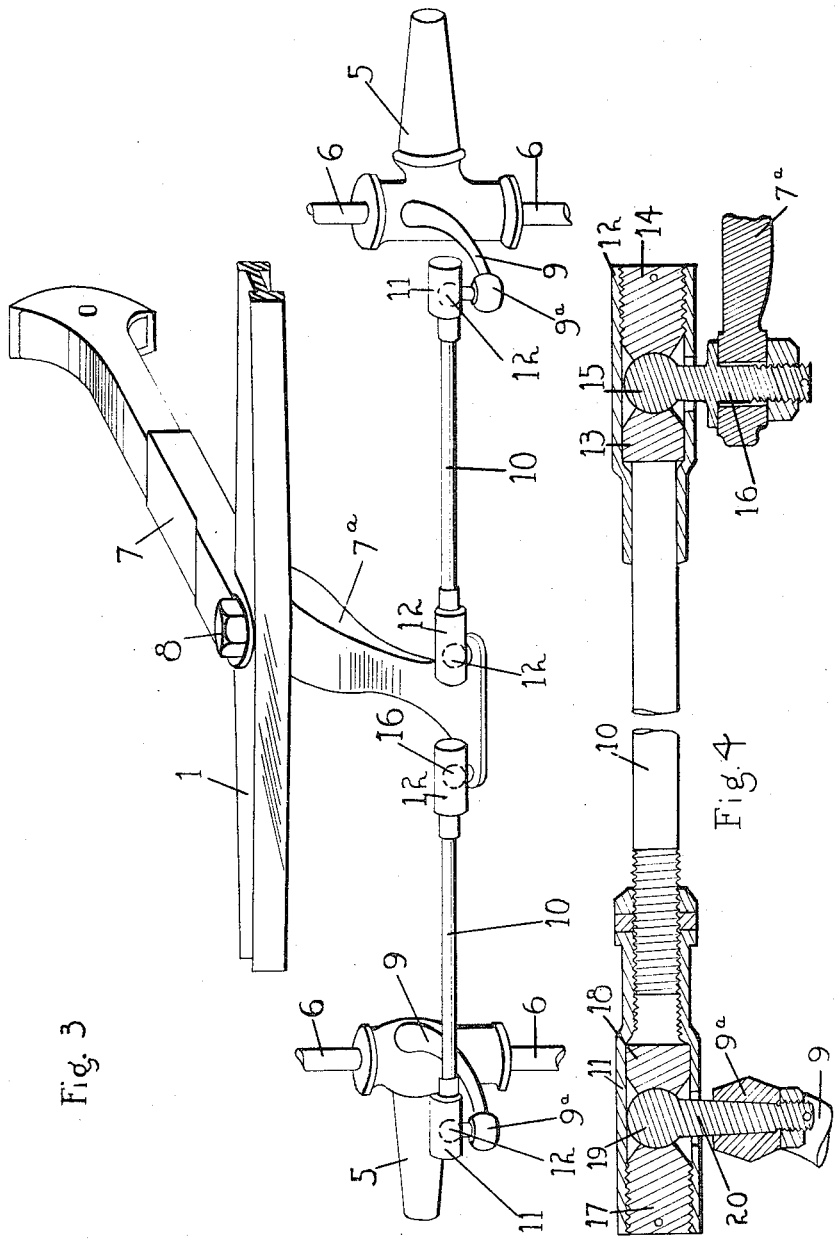

UNITED STATES PATENT OFFICE.

WARREN R. HUDSON, OF TROY, OHIO, ASSIGNOR TO THE TROY WAGON WORKS COMPANY, OF TROY, OHIO, A CORPORATION OF OHIO.

TRAILER-TRUCK.

1,214,037.  Specification of Letters Patent.  Patented Jan. 30, 1917.

Application filed November 1, 1915. Serial No. 59,128.

*To all whom it may concern:*

Be it known that I, WARREN R. HUDSON, a citizen of the United States, residing at Troy, in the county of Miami and State of Ohio, have invented certain new and useful Improvements in Trailer-Trucks, of which the following is a specification.

This invention relates to improvements in steering mechanism particularly adapted for trailer trucks.

The object of the invention is to simplify and make more effective the construction and operation of devices of this character.

Figure 1:
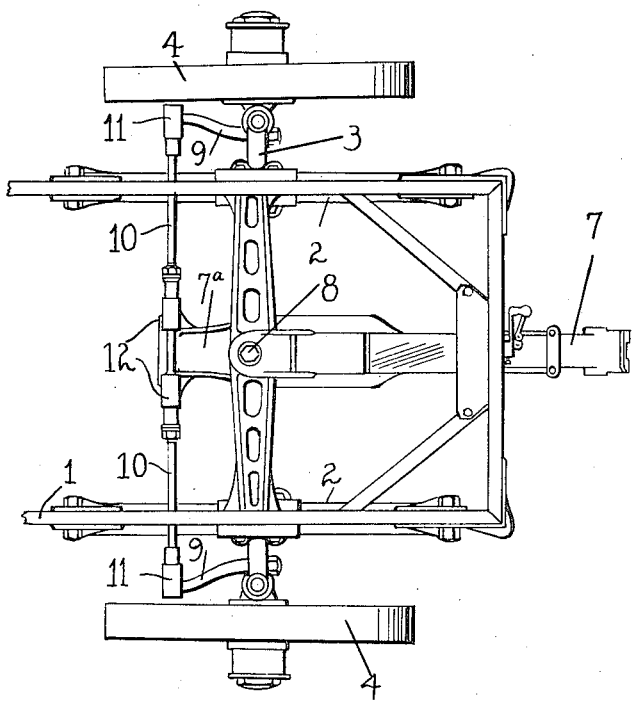
Figure 2:
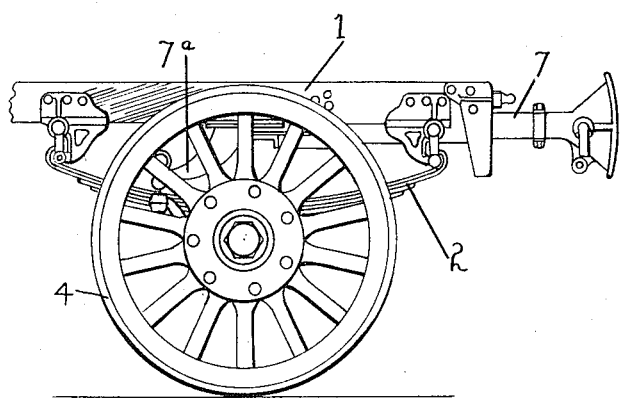

In the accompanying drawings:—Figure 1 is a top plan view of one end of so much of a trailer truck as is necessary to illustrate the improvements. Fig. 2 is a side view of the same. Fig. 3 is a perspective view of the draft bar and steering connections from the same to the wheels. Fig. 4 is a longitudinal section showing one of the connecting rods and its connections with the draft bar and steering arm.

Referring to the drawings, 1 represents the main frame of the truck which is supported by the spring 2 upon the axle 3. The axle has the carrying wheels 4 swivelly connected thereto; the spindles 5 having the usual vertically arranged trunnions 6 which are pivotally connected to the bifurcated ends of the axle in the well known way.

The draft bar 7 is pivotally connected as at 8 to the main frame and has a rearwardly and downwardly extending portion 7$^a$, the rear end of which is connected to the arms 9 of the spindles by rods 10 so that as the draft bar 7 swings in turning the carrying wheels will be steered.

In view of the fact that the draft rod 7 is pivotally connected to and supported by the frame, which frame is mounted upon the axle supported springs, it becomes necessary to make provision for the relative movement of the frame and wheels in these steering connections, and this I accomplish by providing a ball and socket joint at each point of connection of the rods 10 with the steering arms and draft bar. Referring more particularly to Figs. 3 and 4 it will be seen that each rod 10 has suitably secured to each end thereof a cylindrical housing 11 and 12. Within each of the housings 12 are located adjustable socket members 13 and 14, the member 14 being screwthreaded into the outer ends of the housing so that the members may be adjusted. These socket members have adjacent concave surfaces to receive balls 15 which have stems 16 secured on opposite sides of the rear end 7$^a$ of the draw bar. Each of the housings 11 have similarly formed socket members 17 and 18 to receive balls 19, the stems 20 of which are secured in the sockets 9$^a$ on the outer ends of the steering arms 9. Each of the housings 11 has a screwthreaded connection with its rod 10 so that these housings may be adjusted relatively to the rods for the purpose of bringing the wheels in proper alinement.

By this construction it will be seen that all of the vertical and torsional movements and strains of the draft rod and steering wheels relatively to each other due to uneven travel or otherwise will be compensated for by this manner of connecting the draft rod with the steering arms.

Having thus described my invention, I claim:

1. In a vehicle of the character described, a main frame, an axle located below said frame, carrying wheels swivelly connected with said axle, springs for supporting said frame from said axle and wheels, a draft bar pivotally connected with said frame, and steering connections from said draft bar to said wheels, said steering connections having ball and socket joints.

2. In a vehicle of the character described, a main frame, an axle and carrying wheels, springs for supporting said frame from said axle and wheels, a draft bar pivotally connected to said frame, steering rods connecting the inner end of said draft bar with said wheels, said connections consisting of ball and socket joints.

3. In a vehicle of the character described, a main frame, an axle and carrying wheels, springs for supporting said frame from said axle and wheels, a draft bar pivotally connected to said frame, an arm extending from each of said wheels, and a rod connecting each of said arms with the inner end of said draft bar, the connections between each of said rods with said bar and arm consisting of a ball and socket joint.

4. In a vehicle of the character described, a main frame, an axle and carrying wheels, springs for supporting said frame from said axle and wheels, a draft bar pivotally connected with said frame, arms extending from each of said wheels, steering rods, socket members on the respective ends of each of said rods, balls on said arms and draft bar extending into said socket members, and means for adjusting said socket members.

5. In a vehicle of the character described, a main frame, an axle located below said frame, carrying wheels swivelly connected with said axle, springs for supporting said frame from said axle and wheels, a draft bar pivotally connected with said frame having a rearwardly extending portion, and steering rods connecting the rear end of said draft bar with said wheels, said connection comprising ball and socket joints.

6. In a vehicle of the character described, a main frame, an axle located below said frame, carrying wheels swivelly connected to said axle, arms connected to said carrying wheels, springs for supporting said frame from said axle and wheels, a draft bar pivotally connected with said frame, said draft bar projecting rearwardly and downwardly so that its rear end will lie in substantially the same horizontal plane as the free ends of said arms, and steering connections from the rear end of said draft bar to the free ends of said arms, said steering connections having ball and socket joints.

In testimony whereof, I have hereunto set my hand this 26th day of October, 1915.

WARREN R. HUDSON.

Witnesses:
L. H. SHIPMAN,
FLORENCE L. DE FREES.